US011652441B2

(12) United States Patent
Jin et al.

(10) Patent No.: US 11,652,441 B2
(45) Date of Patent: May 16, 2023

(54) PHOTOVOLTAIC CLEANING DEVICE AND WINDPROOF DEVICE THEREOF

(71) Applicant: SUNGROW POWER SUPPLY CO., LTD., Anhui (CN)

(72) Inventors: Zhisheng Jin, Anhui (CN); Jiapeng Zhu, Anhui (CN); Yaobang Wang, Anhui (CN); Wei Li, Anhui (CN); Lichun Zhu, Anhui (CN)

(73) Assignee: SUNPURE TECHNOLOGY CO., LTD., Hefei (CN)

( * ) Notice: Subject to any disclaimer, the term of this patent is extended or adjusted under 35 U.S.C. 154(b) by 628 days.

(21) Appl. No.: 16/775,683

(22) Filed: Jan. 29, 2020

(65) Prior Publication Data

US 2020/0252026 A1 Aug. 6, 2020

(30) Foreign Application Priority Data

Feb. 1, 2019 (CN) ........................ 201920185305.2

(51) Int. Cl.
*H02S 40/10* (2014.01)
*B08B 13/00* (2006.01)

(52) U.S. Cl.
CPC .............. *H02S 40/10* (2014.12); *B08B 13/00* (2013.01)

(58) Field of Classification Search
CPC .... H02S 40/10; B08B 13/00; F24S 2025/018; F24S 40/20; Y02E 10/40; Y02E 10/50
See application file for complete search history.

(56) References Cited

U.S. PATENT DOCUMENTS 10,050,468 B2 8/2018 Wang et al.
2017/0331424 A1* 11/2017 Wang ...................... B08B 1/002
2018/0316303 A1* 11/2018 Bailey ..................... H02S 40/10

FOREIGN PATENT DOCUMENTS

CN 106269601 A 1/2017
WO 2018086081 A1 5/2018

OTHER PUBLICATIONS

INIPO First Examination Report for corresponding IN Application No. 202044004234; dated Jul. 27, 2021.

* cited by examiner

*Primary Examiner* — Erin F Bergner
(74) *Attorney, Agent, or Firm* — Cantor Colburn LLP

(57) ABSTRACT

A photovoltaic cleaning device and a windproof device thereof are provided according to the present application. The windproof device of the photovoltaic cleaning device includes a locking bracket, a locking arm, and a drive device configured to drive the locking arm to move relative to the locking bracket. The locking arm has a locking position of extending into a restricting position of the locking bracket, and a cleaning working position of exiting the restricting position of the locking bracket. During the mounting of the photovoltaic cleaning device, one of the locking arm and the locking bracket is mounted to the cleaning module, and the other is mounted to the supporting frame of the photovoltaic module.

15 Claims, 4 Drawing Sheets

300
301
401
400

PHOTOVOLTAIC CLEANING DEVICE AND WINDPROOF DEVICE THEREOF

CROSS REFERENCE TO RELATED APPLICATIONS

The present application claims the priority to Chinese Patent Application No. 201920185305.2, filed on Feb. 1, 2019, which is incorporated herein by reference in its entirety.

FIELD

The present application relates to the technical field of protection for cleaning of photovoltaic module, and in particular to a windproof device of a photovoltaic cleaning device. The present application further relates to a photovoltaic cleaning device including the windproof device.

BACKGROUND

A photovoltaic power generation device as a clean power generation device is widely used. Generally, the photovoltaic power generation device is mounted outdoors and works for long. Surfaces of photovoltaic modules are prone to dust accumulation. In order to improve the working efficiency of the photovoltaic modules, it is usually necessary to provide a photovoltaic cleaning device to regularly clean the surfaces of the photovoltaic modules.

A conventional photovoltaic cleaning device is parked at a docking station when the photovoltaic cleaning device is in a non-working state. When the photovoltaic cleaning device starts to work, a cleaning module is started from the docking station, and then walks to the photovoltaic module to clean the photovoltaic module. Generally, the docking station is arranged at a position parallel to the photovoltaic module to facilitate walking of the cleaning module.

After finishing the regular cleaning, the cleaning module is parked at the docking station, waiting for the next cleaning. In a windy area, the cleaning module may be blown to a middle of the photovoltaic module, shielding the photovoltaic module. Thus, the normal operation of the photovoltaic module is affected by the cleaning module.

Therefore, a technical issue to be addressed urgently by those skilled in the art is how to reduce the influence of the cleaning module on the normal operation of the photovoltaic module.

SUMMARY

An object of the present application is to provide a windproof device of a photovoltaic cleaning device, to reduce the influence of a cleaning module on the normal operation of a photovoltaic module. Another object of the present application is to provide a photovoltaic cleaning device including the windproof device.

To achieve the above objects, a windproof device of a photovoltaic cleaning device is provided according to the present application, which includes a locking bracket, a locking arm, and a drive device configured to drive the locking arm to move relative to the locking bracket. The locking arm has a locking position of extending into a restricting position of the locking bracket, and a cleaning working position of exiting the restricting position of the locking bracket.

Preferably, the windproof device further includes an intermediate transmission device, two ends of which are respectively connected with the drive device and the locking arm. The intermediate transmission device includes a fixing rod and two intermediate connecting rods. Two ends of the two intermediate connecting rods are respectively hinged to two ends of the fixing rod, and another two ends of the two intermediate connecting rods are hinged to the locking arm. The locking arm, the fixing rod and the two intermediate connecting rods form a quadrilateral connecting rod mechanism. An output end of the drive device is hinged to one intermediate connecting rod.

Preferably, the drive device includes a motor, a push rod, and a gear box which is connected to an output shaft of the motor and configured to drive the push rod to move. The push rod is moved linearly relative to the gear box.

Preferably, the drive device is a telescopic device, and a telescopic end of the telescopic device is hinged to one intermediate connecting rod.

Preferably, a locking end of the locking arm is located on a same side of the two intermediate connecting rods.

Preferably, the intermediate transmission device further includes a transmission plate fixedly connected to a side portion of one intermediate connecting rod, and the output end of the drive device is hinged to the intermediate connecting rod via the transmission plate.

Preferably, the locking bracket includes a blocking rod and a mounting rod fixedly connected with the blocking rod. A locking hole allowing the locking end of the locking arm to pass through is formed between the mounting rod and the blocking rod. When the locking arm is in the locking position, the locking end of the locking arm is locked by the blocking rod.

Preferably, two locking brackets are provided, which respectively are a first locking bracket located at the docking station of the cleaning module and a second locking bracket located at a reversing station of the cleaning module.

A photovoltaic cleaning device includes a cleaning module and a windproof device capable of locking the cleaning module, wherein the windproof device is the windproof device according to any one of the above aspects.

Preferably, the drive device is mounted to the cleaning module and located right below the cleaning module, and the locking bracket is mounted to a supporting frame of the photovoltaic module.

In the above technical solutions, the windproof device of the photovoltaic cleaning device provided according to the present application includes the locking bracket, the locking arm, and the drive device configured to drive the locking arm to move relative to the locking bracket. The locking arm has the locking position of extending into the restricting position of the locking bracket, and the cleaning working position of exiting the restricting position of the locking bracket. During the mounting of the photovoltaic cleaning device, one of the locking arm and the locking bracket is mounted to the cleaning module, and the other is mounted to the supporting frame of the photovoltaic module. When the cleaning module needs to be locked, the drive device drives the locking end of the locking arm to the restricting position of the locking bracket to realize locking of the cleaning module. When the photovoltaic module needs to be cleaned, the drive device drives the locking arm to move in a direction away from the locking bracket, the locking arm exits the locking bracket, and the cleaning module moves freely.

It can be known from the above description that, in the windproof device according to the present application, the drive device is configured to drive the locking arm to cooperate with the locking bracket, so that the cleaning module is locked when the cleaning module is in the docking station, avoiding the situation that the cleaning module is blown onto the photovoltaic module by the wind and adversely affects the normal operation of the photovoltaic module.

BRIEF DESCRIPTION OF THE DRAWINGS

For more clearly illustrating the technical solutions in the embodiments of the present application or in the conventional technology, drawings referred to for describing the embodiments or the conventional technology will be briefly described hereinafter. The drawings in the following description are only examples of the present application, and for those skilled in the art, other drawings may be obtained based on the provided drawings without any creative efforts.

Figure 1:
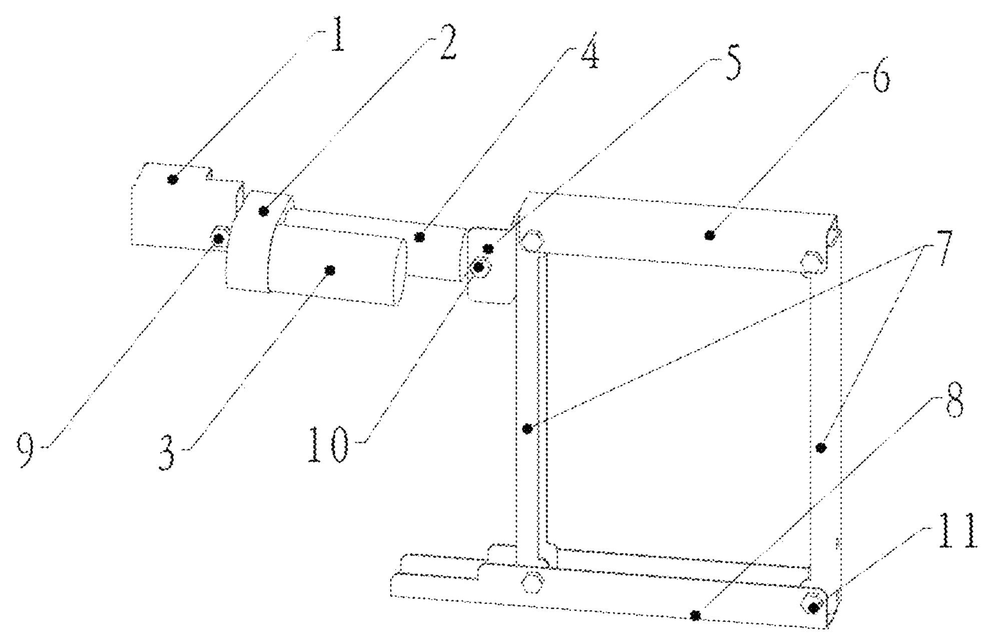
FIG. 1 is a schematic structural view of a windproof device according to an embodiment of the present application.

Reference numerals in FIG. 1 to FIG. 6:

| | |
|---|---|
| 1 mounting plate, | 2 gear box, |
| 3 motor, | 4 push rod, |
| 5 transmission plate, | 6 fixing rod, |
| 7 intermediate connecting rod, | 8 locking arm, |
| 81 locking end, | 9 first hinge shaft, |
| 10 second hinge shaft, | 11 third hinge shaft; |
| 100 reversing station, | 101 second locking bracket, |
| 200 photovoltaic module, | 300 cleaning module, |
| 301 windproof device, | 400 docking station, |
| 401 first locking bracket. | |

DETAILED DESCRIPTION OF THE EMBODIMENTS

A core of the present application is to provide a windproof device of a photovoltaic cleaning device, to reduce the influence of a cleaning module on the normal operation of a photovoltaic module. Another core of the present application is to provide a photovoltaic cleaning device including the windproof device.

In order to make those skilled in the art better understand technical solutions of the present application, the present application will be described in detail hereinafter in conjunction with the drawings and specific embodiments.

Referring to FIG. 1 to FIG. 6, in a specific embodiment, the windproof device of the photovoltaic cleaning device provided according to specific embodiments of the present application includes a locking bracket, a locking arm 8, and a drive device configured to drive the locking arm 8 to move relative to the locking bracket. The locking arm 8 has a locking position of extending into a restricting position of the locking bracket, and a cleaning working position of exiting the restricting position of the locking bracket. Specifically, the drive device may be a telescopic device, in particular a telescopic cylinder or a telescopic rod. The telescopic cylinder may be an air cylinder, a hydraulic cylinder or the like. The locking arm 8 is driven to rotate by the telescopic device, so that the locking arm 8 can be locked by the locking bracket. Specifically, the drive device may be controlled to work by a power supply system. In order to reduce the labor intensity, it is preferred that the drive device is controlled to work by a control system and a power supply system. When the locking arm is located at the locking bracket and the cleaning module is in a non-working state, the control system controls the drive device to drive the locking arm to the locking position. When the cleaning module needs to work, the control system controls the drive device to drive the locking arm to the cleaning working position.

The locking arm 8 and the drive device are mounted to the cleaning module 300, and the locking bracket is mounted to a supporting frame of the photovoltaic module 200. In this case, the cleaning module 300 and the windproof device 301 are controlled to work by a same control system and a same power supply system, which reduces the assembly difficulty and the cost.

Apparently, the locking bracket may be mounted to the cleaning module 300, and the locking arm 8 and the drive device are mounted to the supporting frame of the photovoltaic module 200. The locking bracket can move along with the cleaning module 300. In this case, the windproof device is controlled to work by an independent control system and an independent power supply system. In this case, it is preferred that two locking arms 8 and two drive devices are provided. One locking arm 8 and one drive device form a set of module, and two sets of module are respectively located at a reversing station 100 of the cleaning module 300 and a docking station 400 of the cleaning module 300. Specifically, the reversing station 100 and the docking station 400 are respectively located at two ends of a stroke of the cleaning module 300 in a cleaning direction.

Figure 2:
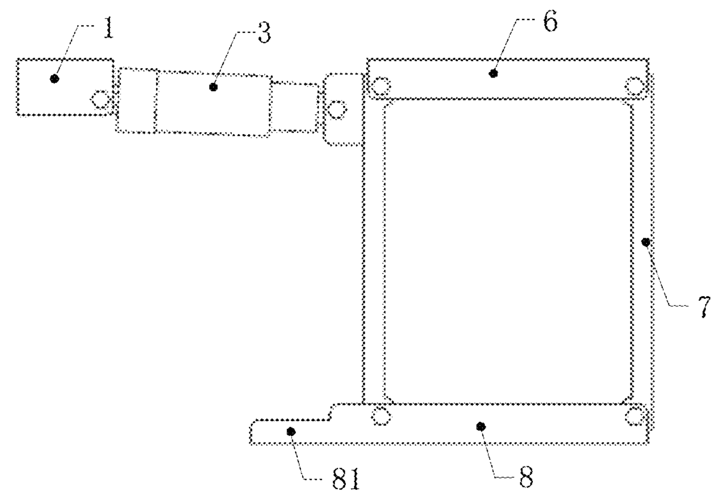
FIG. 2 is a structural view of the windproof device, according to an embodiment of the present application, in a locking position.
Figure 3:
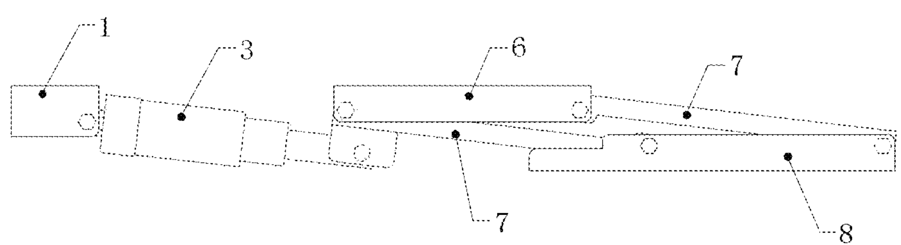
FIG. 3 is a structural view of the windproof device, according to an embodiment of the present application, in a cleaning working position.
Figure 4:
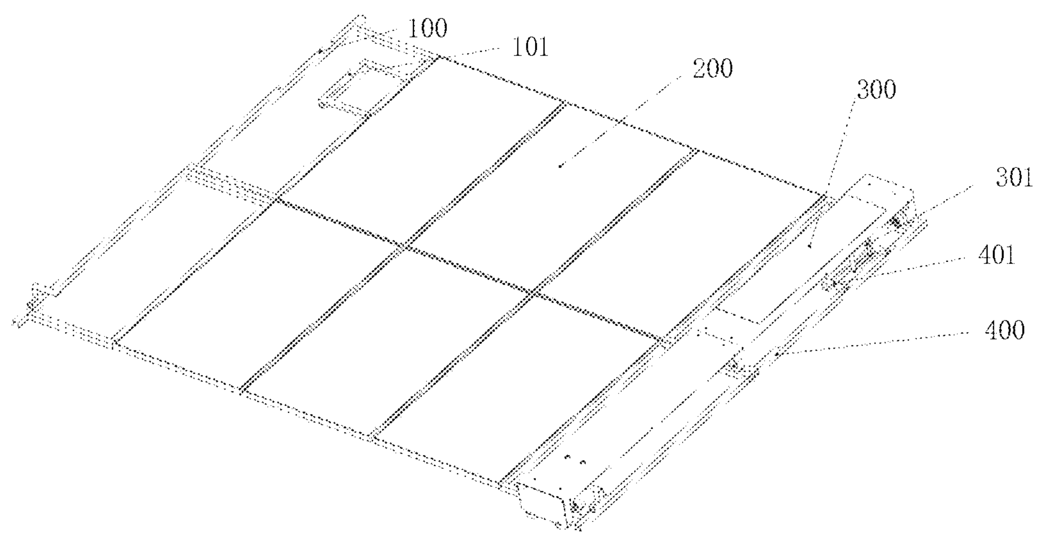
FIG. 4 is a view showing a mounting position of the photovoltaic cleaning device according to an embodiment of the present application.
Figure 5:
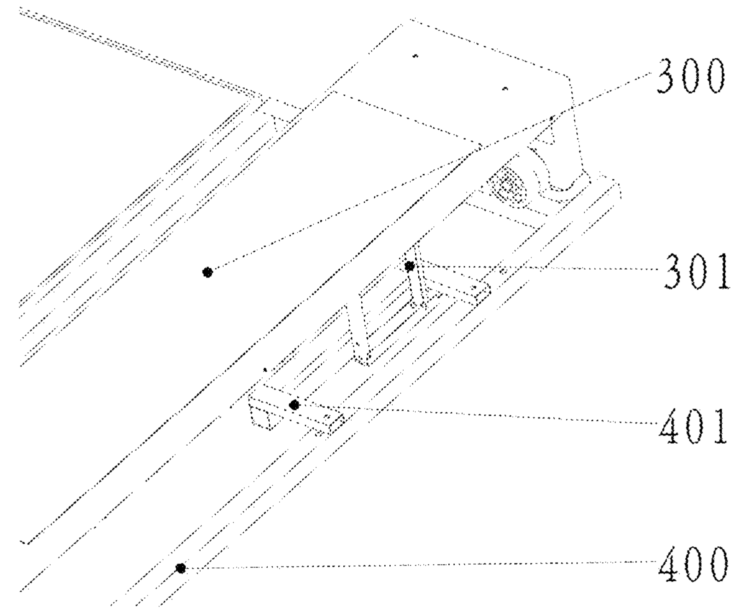
FIG. 5 is a structural position view of the windproof device, according to an embodiment of the present application, in the locking position.
Figure 6:
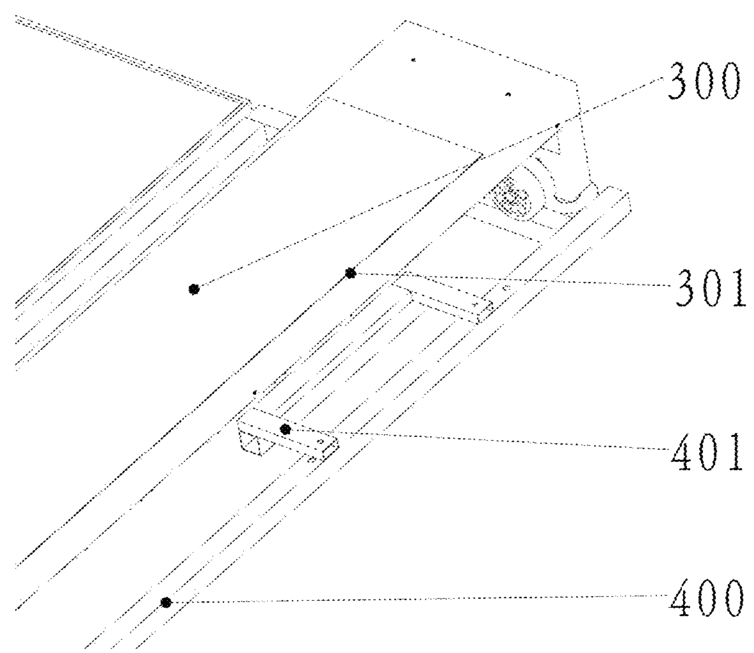
FIG. 6 is a structural view of the windproof device, according to an embodiment of the present application, in the cleaning working position.

In an embodiment, as shown in FIG. 1 to FIG. 3, the windproof device further includes an intermediate transmission device, two ends of which are respectively connected with the drive device and the locking arm 8. The intermediate transmission device includes a fixing rod 6 and two intermediate connecting rods 7. Two ends of the two intermediate connecting rods 7 are respectively hinged to two ends of the fixing rod 6, and another two ends of the two intermediate connecting rods 7 are hinged to the locking arm 8. The locking arm 8, the fixing rod 6 and the two intermediate connecting rods 7 form a quadrilateral connecting rod mechanism. An output end of the drive device is hinged to one intermediate connecting rod 7.

During the mounting of the photovoltaic cleaning device, one of the locking arm 8 and the locking bracket is mounted to the cleaning module 300, and the other is mounted to the supporting frame of the photovoltaic module. When the cleaning module 300 needs to be locked, the drive device drives the locking end 81 of the locking arm 8 to the restricting position of the locking bracket to realize locking of the cleaning module 300. When the photovoltaic module needs to be cleaned, the drive device drives the locking arm 8 to move in a direction away from the locking bracket, the locking arm 8 exits the locking bracket, and the cleaning module 300 moves freely.

It can be known from the above description that, in the windproof device according to specific embodiments of the present application, the drive device is configured to drive the locking arm 8 to cooperate with the locking bracket, so that the cleaning module 300 is locked when the cleaning module 300 is in the docking station, avoiding the situation that the cleaning module is blown onto the photovoltaic module by the wind and adversely affects the normal operation of the photovoltaic module.

In an embodiment, the drive device includes a motor 3, a push rod 4, and a gear box 2 which is connected to an output shaft of the motor 3 and configured to drive the push rod 4 to move. The push rod 4 is moved linearly relative to the gear box 2. Specifically, rotation of the motor 3 may be transformed into a linear motion of the push rod 4 through a worm gear device in the gear box. In a case that the drive device is a telescopic device, a telescopic end of the telescopic device is hinged to one intermediate connecting rod 7. Specifically, a housing of the gear box 2 may be externally fixed by a mounting plate 1. Specifically, the mounting plate 1 and the fixing rod 6 are fixedly mounted to the cleaning module 300.

In order to improve the transmission stability, it is preferred that, the intermediate transmission device further includes a transmission plate 5 fixedly connected to a side portion of one intermediate connecting rod 7, and the output end of the drive device is hinged to the intermediate connecting rod 7 via the transmission plate 5.

The gear box 2 converts the rotatory motion of the motor 3 into the linear motion of the push rod 4; the gear box 2 is hinged to the mounting plate 1 through a first hinge shaft 9; the push rod 4 is hinged to the transmission plate 5 through a second hinge shaft 10; and the locking arm 8, the fixing rod 6, and the two intermediate connecting rods 7 are hinged through third hinge shafts 11.

In an embodiment, two locking brackets are provided, which respectively are a first locking bracket 401 located at the docking station 400 of the cleaning module 300 and a second locking bracket 101 located at a reversing station 100 of the cleaning module 300. In a case that the cleaning module 300 has an abnormal situation and needs to be parked at the reversing station 100, the windproof device 301 cooperates with the second locking bracket 101 at the reversing station 100 to lock the cleaning module 300 at the reversing station 100, to prevent the cleaning module 300 from being blown away from the reversing station 100 by the wind. An unlocking process is similar to above. That is, after the cleaning module 300 finishes normal cleaning and is parked at the docking station 400, the cleaning module 300 is locked to the first locking bracket 401 at the docking station 400, to prevent the cleaning module 300 from being blown away from the docking station 400; and in the case that the cleaning module 300 has an abnormal situation and needs to be parked at the reversing station 100, the windproof device 301 according to the present application can lock the cleaning module 300 at the reversing station 100.

Specifically, the motor 3 rotates clockwise and causes the push rod 4 to retract through the transformation of the gear box 2, driving the intermediate connecting rods 7 and the locking arm 8 to move downward at the same time to reach a locking state, so that the locking arm 8 cooperates with the locking bracket to lock the cleaning module 300 at the docking station 400 of the cleaning module 300 or at the reversing station 100 of the cleaning module 300, thereby preventing the cleaning module 300 from being blown away by the wind. The motor 3 rotates counterclockwise and causes the push rod 4 to extend out through the transformation of the gear box 2, driving the intermediate connecting rods 7 and the locking arm 8 to move upward at the same time to reach an unlocking state, and the cleaning module 300 then works normally.

Apparently, the drive device may directly drive the locking arm 8 to rotate by the motor 3, and the locking and unlocking can be reached by controlling a rotation angle of the locking arm 8. Apparently, a linear motor 3 may be provided to drive the push rod 4 to move, and the cleaning module can be directly locked by the push rod 4.

Specifically, the drive device may be controlled to work through the on-off of an electromagnet.

In order to facilitate effective locking, in an embodiment, the locking end 81 of the locking arm 8 is located on a same side of the two intermediate connecting rods 7.

Specifically, the locking bracket includes a blocking rod and a mounting rod fixedly connected with the blocking rod. A locking hole allowing the locking end 81 of the locking arm 8 to pass through is formed between the mounting rod and the blocking rod. When the locking arm 8 is in the locking position, the locking end 81 of the locking arm 8 is locked by the blocking rod. Specifically, the locking bracket may be a rectangular frame.

The photovoltaic cleaning device according to the present application includes a cleaning module 300 and a windproof device 301 capable of locking the cleaning module 300, where the windproof device 301 is the windproof device according to any one of the above aspects. The specific structure and technical effects of the windproof device 301 are described in the foregoing. Since the photovoltaic cleaning device includes the above windproof device 301, the photovoltaic cleaning device has the same technical effects, which will not be described herein again.

In order to prolong the service life of the windproof device 301, in an embodiment, the drive device is mounted to the cleaning module 300 and located right below the cleaning module 300, and the locking bracket is mounted to the supporting frame of the photovoltaic module. In an embodiment, the locking bracket is a portion of the supporting frame of the photovoltaic module, and the locking bracket and the supporting frame of the photovoltaic module are directly assembled during machining.

In the present specification, the embodiments are described in a progressive manner. Each embodiment mainly focuses on an aspect different from other embodiments, and reference can be made to these similar parts among the embodiments.

Based on the above description of the disclosed embodiments, those skilled in the art are capable of embodying or exploiting the present application. It is obvious for those skilled in the art to make many modifications to these embodiments. The general principle defined herein may be applied to other embodiments without departing from the spirit or scope of the present application. Therefore, the present application is not limited to these embodiments illustrated herein, but should be defined by the broadest scope consistent with the principle and novel features disclosed herein.

The invention claimed is:

1. A windproof device of a photovoltaic cleaning device comprising:

a locking bracket, a locking arm, a drive device configured to drive the locking arm to move relative to the locking bracket, and an intermediate transmission device, wherein the locking arm has a locking position of extending into a restricting position of the locking bracket, and a cleaning working position of exiting the restricting position of the locking bracket, wherein two ends of the intermediate transmission device are respectively connected with the drive device and the locking arm, the intermediate transmission device comprises a fixing rod and two intermediate connecting rods, two ends of the two intermediate connecting rods are respectively hinged to two ends of the fixing rod, another two ends of the two intermediate connecting rods are hinged to the locking arm, the locking arm, the fixing rod and the two intermediate connecting rods form a quadrilateral connecting rod mechanism, and an output end of the drive device is hinged to one intermediate connecting rod.

2. The windproof device according to claim 1, wherein the drive device comprises a motor, a push rod, and a gear box which is connected to an output shaft of the motor and configured to drive the push rod to move, and the push rod is moved linearly relative to the gear box.

3. The windproof device according to claim 2, wherein the drive device is a telescopic device, and a telescopic end of the telescopic device is hinged to one intermediate connecting rod.

4. The windproof device according to claim 2, wherein a locking end of the locking arm is located on a same side of the two intermediate connecting rods.

5. The windproof device according to claim 2, wherein the intermediate transmission device further comprises a transmission plate fixedly connected to a side portion of one intermediate connecting rod, and the output end of the drive device is hinged to the intermediate connecting rod via the transmission plate.

6. The windproof device according to claim 1, wherein, the locking bracket comprises a blocking rod and a mounting rod fixedly connected with the blocking rod, a locking hole allowing a locking end of the locking arm to pass through is formed between the mounting rod and the blocking rod, and when the locking arm is in the locking position, the locking end of the locking arm is locked by the blocking rod.

7. The windproof device according to claim 6, wherein two locking brackets are provided, which respectively are a first locking bracket located at a docking station of a cleaning module and a second locking bracket located at a reversing station of the cleaning module.

8. A photovoltaic cleaning device, comprising a cleaning module and a windproof device capable of locking the cleaning module, wherein the windproof device is the windproof device according to claim 1.

9. A photovoltaic cleaning device, comprising a cleaning module and a windproof device capable of locking the cleaning module, wherein the windproof device is the windproof device according to claim 2.

10. A photovoltaic cleaning device, comprising a cleaning module and a windproof device capable of locking the cleaning module, wherein the windproof device is the windproof device according to claim 3.

11. A photovoltaic cleaning device, comprising a cleaning module and a windproof device capable of locking the cleaning module, wherein the windproof device is the windproof device according to claim 4.

12. A photovoltaic cleaning device, comprising a cleaning module and a windproof device capable of locking the cleaning module, wherein the windproof device is the windproof device according to claim 5.

13. A photovoltaic cleaning device, comprising a cleaning module and a windproof device capable of locking the cleaning module, wherein the windproof device is the windproof device according to claim 6.

14. A photovoltaic cleaning device, comprising a cleaning module and a windproof device capable of locking the cleaning module, wherein the windproof device is the windproof device according to claim 7.

15. The photovoltaic cleaning device according to claim 8, wherein the drive device is mounted to the cleaning module and located right below the cleaning module, and the locking bracket is mounted to a supporting frame of a photovoltaic module.

* * * * *